US005501241A

United States Patent [19]
Jacobson

[11] Patent Number: 5,501,241
[45] Date of Patent: Mar. 26, 1996

[54] VEGETABLE AERATING DEVICE

[76] Inventor: Glenn R. Jacobson, 1950 N. Andrews Ave., Apartment 203D, Ft.Lauderdale, Fla. 33311

[21] Appl. No.: 330,320

[22] Filed: Oct. 27, 1994

[51] Int. Cl.⁶ .................................. B08B 3/02; F26B 9/06
[52] U.S. Cl. ............................ 134/95.2; 15/3.12; 34/202; 134/102.3; 134/107; 134/199; 134/200
[58] Field of Search ..................... 134/25.3, 95.2, 134/102.3, 107, 153, 199, 200; 15/3.12; 34/130, 187, 202, 595, 596

[56] References Cited

U.S. PATENT DOCUMENTS

| | | | |
|---|---|---|---|
| 19,635 | 3/1858 | Heaton | 34/187 |
| 1,323,216 | 11/1919 | Cornwall et al. | 134/95.2 X |
| 2,399,267 | 4/1946 | Szatyn | 134/107 X |
| 2,725,062 | 11/1955 | Vile | 134/25.3 X |
| 3,041,212 | 6/1962 | Booth | 134/25.3 X |
| 4,173,051 | 11/1979 | Reid | 15/3.12 |
| 4,195,419 | 4/1980 | Quayle | 134/102.3 X |
| 4,509,545 | 4/1985 | Trotter | 134/199 |
| 4,809,723 | 3/1989 | Meliconi | 134/200 X |

FOREIGN PATENT DOCUMENTS 816910  7/1959  United Kingdom ................ 134/102.3

Primary Examiner—Philip R. Coe
Attorney, Agent, or Firm—Malin, Haley, DiMaggio & Crosby

[57] ABSTRACT

A device for drying food products such as vegetables by aeration. The device includes a container having a domed cover and housing a network of tubing having a plurality of apertures through which compressed air is discharged for drying food products supported within said container in a mesh basket. The dome-shaped cover enhances air circulation by re-directing upward flowing air back down toward the enclosed food product causing certain foods such as lettuce to tumble in the resulting air stream. A pressure relief valve operates to limit pressure within the container and allow the escape of moisture laden air. In an alternate embodiment water is first allowed to flow through the tubing network and out of the tube apertures for washing the enclosed food product.

9 Claims, 2 Drawing Sheets

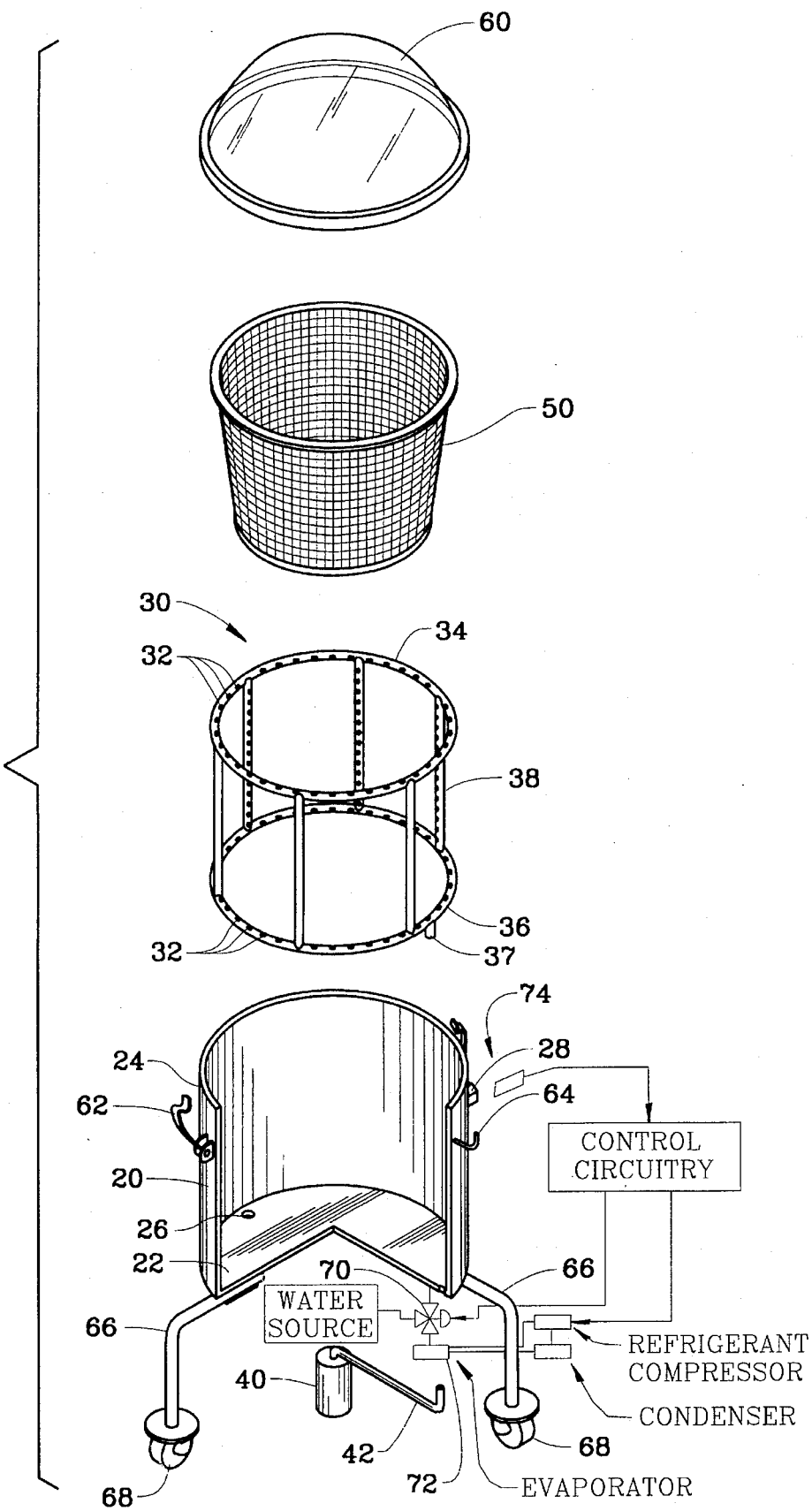

VEGETABLE AERATING DEVICE

BACKGROUND OF THE INVENTION

1. Field of the Invention

The instant invention relates to devices for aerating food products, and more particularly to a device for drying washed foods, such as vegetables through aeration. An alternate embodiment contemplates both washing and drying foods, in preparation for consumption, thereby removing undesirable contaminants such as chemical and particulate matter.

2. Description of the Prior Art

It is common practice to clean food products such as fruits and vegetables prior to consumption so as to remove soil and chemical contaminants. Since hand washing is time consuming and inefficient when large quantities of food product are required as in restaurant and other food service industries, mechanical washing devices have been developed.

One such device is revealed in U.S. Pat. No. 4,509,545 issued to Trotter which discloses a portable vegetable washing container designed to maintain a continuous flow of washing liquid at a constant level whereby water is supplied through upper and lower spray rings, housed within the container, such that items to be cleaned are circulated from the bottom of the container towards the water surface where the items are sprayed in a continuous manner thereby removing contaminants. There are several inherent disadvantages, however, associated with Trotter's device. First, the vegetables remain immersed in water along with the removed contaminants thereby limiting the effectiveness of Trotter's device since the contaminants in solution may recontaminate the vegetables by adhering to the vegetables upon drainage. Second, Trotter's invention makes no provision for drying the saturated vegetables.

U.S. Pat. No. 4,809,723, issued to Meliconi, discloses an APPLIANCE FOR WASHING AND SPIN DRYING LETTUCE, VEGETABLES AND SIMILAR PRODUCE comprising a basket that is rotatable about a horizontal axis of symmetry internally of a container fitted with a removable lid. Meliconi contemplates spin drying lettuce while allowing water separated by centrifugal force to collect and drain out the bottom. Meliconi recognizes, however, that spin drying can be of limited effectiveness since for produce, especially lettuce, to dry completely it must be rearranged and spun multiple times.

Therefore, the prior art devices have achieved only limited and partial success in automating the food product washing and drying process. In particular, the prior art drying methods of drip drying or spin drying have proven insufficient, and thus, a need exists for an improved means for drying food products such as vegetables and especially lettuce. In addition, there still exists a need for a device that both effectively washes vegetables and thoroughly dries the vegetables, without causing damage or bruising, in a manner that is more effective than mere drip drying or spin drying.

SUMMARY OF THE INVENTION

It is to solving the aforementioned disadvantages and limitations of the prior art that the instant invention is directed toward. The instant invention contemplates a device that improves upon the prior art by providing an effective means for drying washed vegetables by aeration.

The instant invention includes a container for housing a quantity of vegetables. The vegetables are suspended above the container floor in a mesh basket. The container is capped by a clear domed lid for enhancing the airflow within the container and allowing the user to visually monitor the contents during the drying process.

An air compressor provides a constant flow of air for aeration drying to a network of perforated tubing housed within the container and surrounding the suspended vegetables. The tubing acts as a duct for directionally distributing air toward the vegetables for the drying process.

In practice, washed vegetables such as lettuce are deposited in the mesh basket within the container and the domed lid is placed over the top of the container. Next, the air compressor is activated thereby forcing air into the tubing housed within the container. The compressed air is distributed around the container perimeter and directed inward toward the suspended vegetables thereby drying the vegetables by aeration. A relief valve, or vent, allows moisture laden air to escape the container thereby removing moisture and preventing pressure buildup.

The instant invention may be remotely activated and may include a timer, or moisture detecting circuitry, to control the drying cycle. Furthermore, in an alternate embodiment, the instant invention may incorporate a changeover valve that first permits water to flow through the container tubing for washing the enclosed vegetables, then modulating and allowing air to flow through the tubing for drying the enclosed vegetables as previously described.

In accordance with the instant invention, it is an object thereof to provide an improved apparatus for drying food products, such as vegetables and especially greens, through aeration.

It is a further object of the instant invention to provide an improved apparatus for drying vegetable greens, such as lettuce, through the use of compressed air such that the greens tumble dry in a generated airstream thereby eliminating any need for manual rearrangement.

Still another object of the present invention is to provide a vegetable drying apparatus incorporating automatic controls for optimal termination of the drying process.

A further object of the present invention is to provide a food sanitation apparatus that automatically washes and dries a variety of food products.

Yet another object of the instant invention is to provide a vegetable washing and drying apparatus that washes without allowing the vegetables to soak in dirty water and dries through aeration.

In accordance with these and other objects which will become apparent hereinafter, the instant invention will now be described with particular reference to the accompanying drawings.

BRIEF DESCRIPTION OF THE DRAWINGS

FIG. 2 depicts an exploded view, partially in section of the instant invention.

DESCRIPTION OF THE PREFERRED EMBODIMENTS

Figure 1:
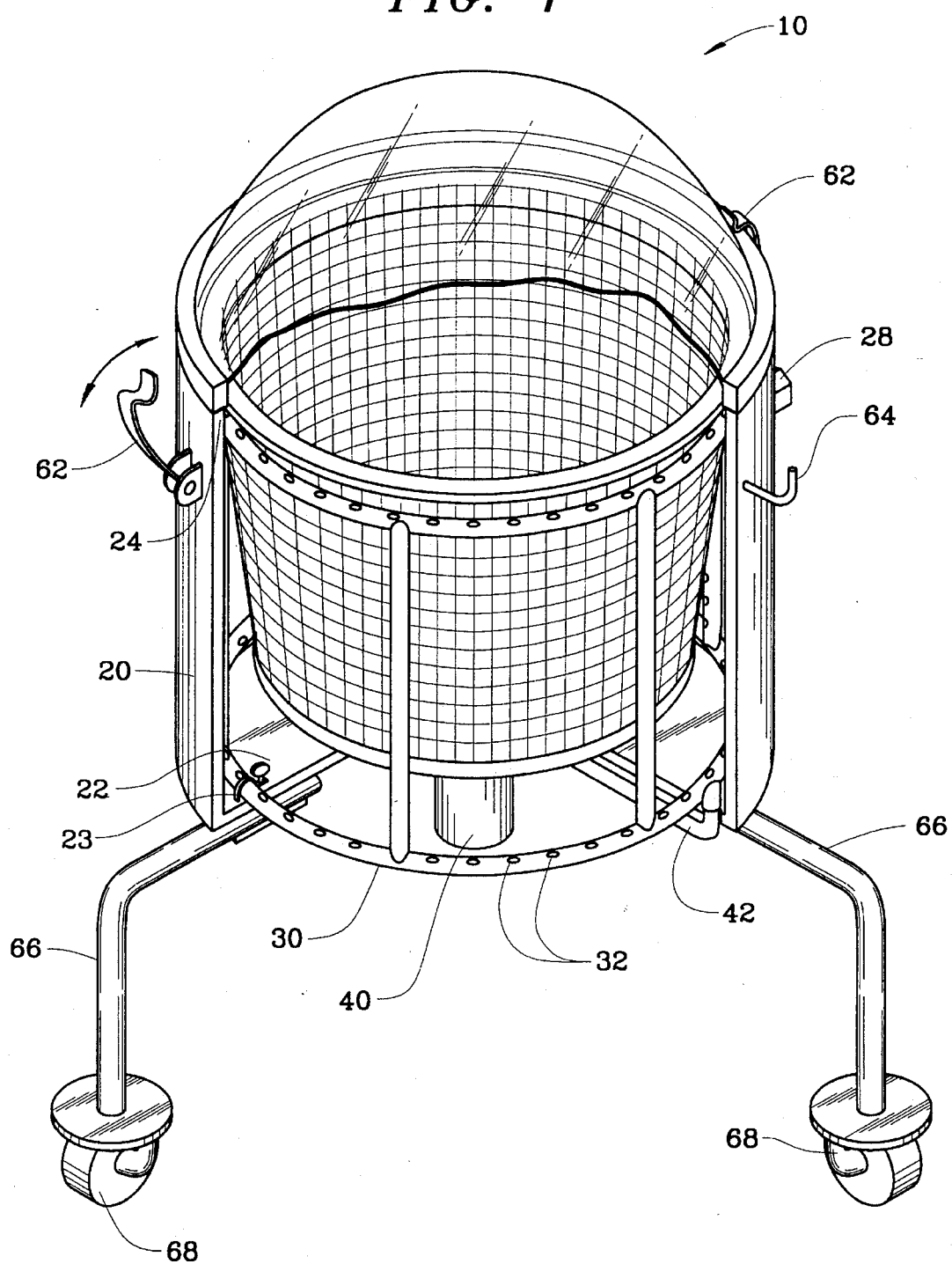
FIG. 1 depicts a perspective view, partially in section of the instant invention.

FIG. 1 depicts a perspective view, partially in section of the instant invention generally designated 10, and FIG. 2 depicts an exploded view, partially in section of the instant invention 10. The invention includes a cylindrical container 20 having a floor 22 and a vertical container wall terminating at a rim 24. Container 20 may be fabricated from stainless steal or any suitable material in accordance with National Sanitation Foundation ("NSF") standards. Container 20 is sized depending on the application; a household appliance model may have a capacity of 1 gallon or less, while an industrial model may have a capacity of 500 gallons or more. Furthermore, large industrial models may incorporate gasketed container doors for facilitating access.

The container houses a network of tubing 30 having a plurality of apertures 32. In the preferred embodiment the tubing network includes upper and lower circular rings, 34 and 36 respectively, and a plurality of vertical tubing sections 38 such that rings 34 and 36 are in fluid communication. Tubing 30 may be fabricated from stainless steel or plastic or any other suitable material in accordance with NSF standards. The tubing network 30 incorporates a fitting 37 for connecting a fluid supply. Tubing apertures 32 are angled for reasons that will soon become apparent. Tubing 30 may be anchored within container 20 by clamps 23 fixed to the container floor 22. Additional clamps 23 may be fixed to the container 20 interior for anchoring the tubing 30 as required for a particular application.

An air compressor 40 provides a supply of compressed air to the tubing network 30 for drying purposes, via an air supply duct 42 connected to tubing fitting 37. In the preferred embodiment air compressor 40 is mounted on container 20. Tube apertures 32 are angularly positioned so as to direct drying air upward so that vegetables, such as lettuce, are suspended causing the vegetable to tumble in the resulting air stream thereby enhancing the drying process. In the preferred embodiment upper ring 34 apertures are angled downward, lower ring 36 apertures are angled upward, and vertical tubing 38 apertures are directed toward the container's center. Thus, when airflow is initiated, air current is directed downward from the upper ring 34, upward from the lower ring 36 and toward the center from the vertical tubing 38; thereby causing the enclosed vegetables to tumble and enhancing the drying process since the vegetables are exposed to drying air from all angles.

A mesh basket 50 is housed within container 20 and supported such that basket 50 is elevated with respect to container floor 22 thereby maintaining washed vegetables above any water that may drip and pool on the container floor 22 such that the vegetables do not soak in water. Basket 50 may have a shape resembling an inverted truncated cone having a top end with diameter larger than its bottom end diameter as best seen in FIG. 2.

Container 20 is capped by a removable domed lid 60. Lid 60 may be fabricated from glass or plastic, and may be clear to allow a user to visually inspect the container's contents and monitor the drying process. Domed lid 60 is structured to function by redirecting upward flowing air, during the drying process, back down into container 20 thereby enhancing the drying effectiveness. Domed lid 60 is secured to container 20 by a plurality of lid clamps 62, and when not in use, may be hung on a lid hook 64 attached to the side of container 20.

Container 20 may also incorporate a plurality of support legs 66 terminating in wheels 68 to permit a user to roll the instant invention 10 to selected locations for storage or use. Wheels 68 may each incorporate a foot activated brake (not shown) for parking container 20 at a user selected location. Container 20 may further incorporate a valved drain 26 located proximate the container floor 22 to facilitate drainage of liquid that has accumulated or pooled on the container floor. In addition, a means for relieving pressure, such as a vent 28, is incorporated into container 20, or domed lid 60 (not shown), to allow moisture laden air to escape container 20 thereby facilitating the drying process.

Control of the drying process may be accomplished by a manual on/off switch, either mounted on container 20 or remotely; or more sophisticated controls incorporating timer circuitry or moisture indicating circuitry 74 for optimal termination of the drying cycle based on either time or moisture content.

Thus, the instant invention performs as follows: first, vegetables are washed and placed in basket 50 which is matingly received within container 20; next, domed lid 60 is mounted on container rim 24 and secured by lid clamps 62; water is allowed to drip through the basket 50 mesh and pool on the container floor 22, at which time it may be drained; compressor 40 is then activated causing ambient air at approximately 50 percent relative humidity to circulate through supply duct 42 into tubing network 30 whereby the air is distributed exiting apertures 32 such that a constant stream of air is directed upward from apertures 32 thereby causing lightweight vegetables such as lettuce to become suspended in the air stream while tumble drying, with moisture laden air escaping through a vent or pressure relief valve; finally, compressor 40 is deactivated at a predetermined time, lid 60 is removed, and the dried vegetables used as desired.

In an alternate embodiment, supply duct 42 may incorporate a change over valve 70 for connecting a supply of pressurized water thereby selectively allowing water to flow through tubing network 30 whereby water would exit tubing apertures 32 producing a spray for washing the vegetables contained in basket 50. In this embodiment the instant invention functions to wash and dry the enclosed vegetables.

Thus, this alternate embodiment functions according to the following sequence: first, soiled vegetables are inserted in mesh basket 50 which is in turn placed in container 20; next, domed lid 60 is mounted on container rim 24 and secured by lid clamps 62; a wash sequence is initiated by activating the changeover valve such that water is allowed to flow into tubing network 30, exiting apertures 32, thereby producing a spray that cleans the vegetables; after a predetermined time, the change over valve is deactivated and modulated thereby causing the flow of water to stop; water is then allowed to drip through the basket 50 mesh and pool on the container floor 22, at which time it may be drained (optional); compressor 40 is then activated causing ambient air at approximately 50 percent relative humidity to circulate through supply duct 42 into tubing network 30 whereby the air is distributed exiting apertures 32 such that a constant stream of air is directed upward from apertures 32 thereby causing lightweight vegetables such as lettuce to become suspended in the air stream while tumble drying with moisture laden air escaping through a pressure relief valve; finally, compressor 40 is deactivated at a predetermined time, lid 60 is removed, and the dried vegetables used as desired.

An alternate embodiment contemplates incorporating a precooling refrigeration unit 72 in conjunction with an air compressor such that compressed ambient air is cooled and dehumidified prior to injection into the aerating device. In this embodiment the pre-cooler functions to both chill the vegetables enclosed within the aerating device and more effectively dry the vegetables since the pre-cooled air is dehumidified and hence capable of absorbing a greater amount of moisture.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An apparatus for drying items by aeration including:
    a container having a floor and a vertically extending wall terminating in a container rim;
    tubing housed within said container, said tubing having a plurality of apertures;
    a mesh basket for holding items for drying, said basket sized for insertion within said container such that said basket is demountably supported by said container and elevated above said container floor;
    a container lid, said lid sized for mounting on said container rim;
    means for compressing ambient air, said compressing means in fluid communication with said tubing such that ambient air flows through said tubing and exits said tubing apertures thereby generating airflow within said container for drying items contained therein; and
    a valve for selectively allowing water to flow through said tubing whereby said water exits said tubing through said tubing apertures thereby creating a cleansing spray for washing items contained within said container.

2. An apparatus for drying items according to claim 1 wherein said container lid is dome-shaped whereby said domed lid functions to re-direct upward flowing air downward thereby enhancing container airflow.

3. An apparatus for drying items according to claim 2 wherein said domed container lid is transparent thereby allowing visual inspection items housed within said container.

4. An apparatus for drying items according to claim 1, wherein said container incorporates a pressure relief valve maintaining a predetermined pressure level within said container and allowing the escape of moisture laden air.

5. An apparatus for drying items according to claim 1, wherein said container floor incorporates a drain for selectively draining fluid accumulating on the container floor.

6. An apparatus for drying items according to claim 1, wherein said container incorporates a plurality of downwardly extending support legs terminating in wheels.

7. An apparatus for drying items according to claim 1, wherein said ambient air compressing means is controlled by humidity detecting circuitry having a sensor located within said container such that said compressing means deactivates when the humidity within the container reaches a predetermined level.

8. An apparatus for drying items according to claim 1, wherein said apparatus incorporates a means for cooling and dehumidifying air such that dehumidified air exits said tubing apertures.

9. An apparatus for washing and drying vegetables including:
    a container having a floor and a vertically extending wall terminating in a container rim;
    said container having a transparent dome-shaped container lid, said lid sized for mounting on said container rim and secured by at least one latch thereby providing a positive seal;
    said container further incorporating a plurality of downwardly projecting support legs terminating in wheels for supporting said container and enabling a user to selectively position said container;
    tubing housed within said container, said tubing having a plurality of apertures;
    a mesh basket for holding vegetables for washing and drying, said basket sized for insertion within said container such that said basket is demountably supported by said container and elevated above said container floor;
    a valve for selectively allowing water to flow through said tubing whereby said water exits said tubing through said tubing apertures thereby creating a cleansing spray for washing vegetables contained within said container;
    said container floor incorporating a valved drain for selectively draining fluid accumulating on said container floor;
    means for compressing ambient air in fluid communication with said tubing such that ambient air flows through said tubing and exits said tubing apertures thereby generating airflow within said container for drying items contained therein;
    means for relieving pressure whereby said pressure relieving means allows moisture laden air to escape said container thereby maintaining said container pressure at a predetermined pressure level and removing moisture;
    means for controlling said valve and said compressing means such that said valve is first modulated to an open position wherein water is allowed to flow through said tubing and exit said apertures thereby initiating a washing process for a predetermined period of time, then modulating said valve to a closed position and activating said air compressing means whereby compressed ambient air is allowed to flow through said tubing and exit said apertures thereby generating airflow within said container for drying said vegetables for a predetermined period of time.

* * * * *